United States Patent Office 3,310,549
Patented Mar. 21, 1967

3,310,549
NITRO CONTAINING AZOXY COMPOUNDS
Anton J. Havlik, La Crescenta, Calif., and Gustave B. Linden, Short Hills, N.J., assignors to Aerojet-General Corporation, Azusa, Calif., a corporation of Ohio
No Drawing. Filed July 10, 1964, Ser. No. 382,439
10 Claims. (Cl. 260—143)

This invention pertains to a novel class of nitro-containing azoxy compounds and to their method of preparation.

Previously, azoxy compounds have been prepared, for example, by reducing nitrobenzene with sodium methoxide in methanol solution as shown in the following equation:

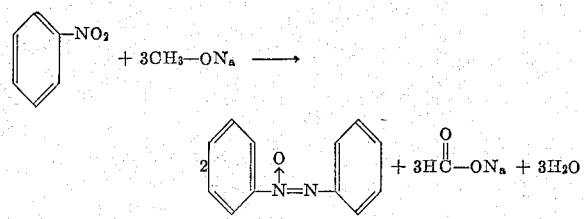

This reaction, involving the reaction of the nitro group, is not suited for the preparation of nitro-containing azoxy compounds. However, by the invention hereinafter described, we have discovered that nitro-containing azoxy compounds possessed of numerous beneficial utilities, can be prepared directly and simply. By our invention, there is provided a new route to nitro-containing azoxy compounds.

It is an object of this invention to prepare a new class of azoxy compounds. It is another object of this invention to prepare a new class of compounds particularly useful as explosives and diesel fuel additives. It is a further object of this invention to prepare azoxy compounds by a novel method. These and other objects of this invention will become apparent from the detailed description which follows.

The novel azoxy compounds of our invention have the following general formula:

$$R'-N=\overset{\overset{O}{\uparrow}}{N}-R$$

wherein R and R' are selected from the group consisting of nitroaryl and nitroalkyl radicals. Preferably, when one of these groups is nitroaryl, the other is a nitroalkyl radical wherein the carbon atom attached to the azoxy group carries a nitro group. The R and R' groups may be branched or straight chain, with the lower members of the series being preferred. Illustrative of such groups are 1-nitroethyl, 2-nitropropyl, 3-nitropropyl, 2-nitrophenyl, 4-nitrophenyl, 2,4-dinitrophenyl, 2-nitronaphthyl and 2,4,6-trinitrophenyl. In general, the R and R' groups contain from one to about twelve carbon atoms and from one to four nitro groups.

Typical of the compounds within the scope of the above formula are:

2-(2-nitronaphthylazoxy)-2-nitropropane,
4-(2-nitrophenylazoxy)-4-nitroheptane,
4-(2,4-dinitrophenylazoxy)-4-nitroheptane,
4-(2,4,6-trinitrophenylazoxy)-4-nitroheptane.

The novel compound of this invention are prepared in accordance with the following general reaction:

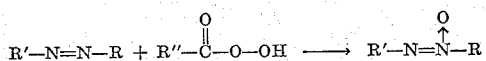

wherein R and R' are as previously defined, and R" is selected from the group consisting of phenyl, lower alkyl, and lower haloalkyl. Typically, R" may be, for example, $-CH_3$, $-C_2H_5$, $-C_3H_7$,

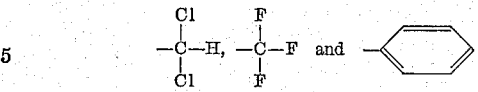

Preferably, the R" group contains from one to about six carbon atoms.

In the above reaction, the per-acid reactant is supplied directly, or may be generated in situ by reaction of hydrogen peroxide with an organic acid anhydride. Thus, for example, trifluoroperacetic acid may be generated in situ by reaction of hydrogen peroxide with trifluoroacetic anhydride. In a similar manner other per-acids, such as peracetic acid and perbenzoic acid may be provided.

The azo starting material is normally prepared by diazotizing an amine with an alkali metal nitrite in concentrated acid, and then reacting this material with a nitroalkane or salt thereof. One method of preparing the azo starting materials is disclosed in U.S. Patent No. 2,441,800, issued May 18, 1948.

In the above reaction the proportions of the reactants used are not critical. In general, the per-acid is employed in a stoichiometric excess over that required to react with all of the azo reactant. This procedure has been found to provide the best yields of the desired azoxy compounds.

The reaction of this invention is preferably, although not necessarily, carried out in the presence of a substantially inert reactant solvent such as methylene chloride, ethylene chloride, or carbon tetrachloride. Usually the reaction is conducted at a temperature corresponding to the reflux temperature of the reaction solvent. However, the reaction temperature is not critical and may be varied over a wide range of from about 0° C. to about 150° C.

The new compounds of this invention may be isolated and purified in conventional manner such as by extraction, filtration, evaporation, distillation, and/or scrubbing. If it is intended that the novel azoxy compound be employed as explosives, it is preferable that the compound be thoroughly dried prior to use.

The following examples are presented solely with the purpose of illustration and should not be regarded as limiting the scope of the invention in any way. In the examples the parts or the percentages are by weight unless otherwise indicated.

EXAMPLE I

*Preparation of 2-(2-nitrophenylazoxy)-2-nitropropane*

A solution of 11.1 grams of sodium nitrite in 100 ml. of conc. sulfuric acid was added below 20° C. to 20 grams of O-nitroaniline dissolved in 240 ml. of glacial acetic acid. The acetic solution of the diazotized amine was added to a previously prepared mixture consisting of 65 grams of 2-nitropropane, 400 grams of sodium hydroxide and 100 ml. of water. The 2-nitropropane had previously been shaken for 1 hour with 6 grams of the sodium hydroxide and then added to the solution of 394 grams of sodium hydroxide in 1000 ml. of water. The addition of the acidic solution of the diazonium salt to the alkaline 2-nitropropane solution was carried out in a 4-liter beaker provided with a mechanical stirrer. The temperature of the reaction mixture was maintained between 5° C. and −20° C., and the addition was completed in 20 minutes. After an additional 300 ml. of water was added to the mixture, the temperature was kept between −20° C. and −10° C. for an additional hour. After the temperature reached −5° C. another 500 ml. of water was added, and the mixture was divided into eight 300-ml. portions. Each of these portions was added to 1000 ml. of water, and the precipitates which formed were combined and washed with ten 100-ml. portions of water. The residue was washed with eleven 100-ml. portions of 100 percent ethanol. The ethanol extracts were combined and concentrated to one-half of the original volume. The addition of 800 ml. of water to the concentrated ethanol extract precipitated a red solid. The precipitate was washed with 400 ml. of water, and the residue was recrystallized from 80 ml. of 100 percent ethanol to give 15.1 grams of red crystalline solid, M.P. 58.5 to 59.5. A sample of this material was recrystallized from a mixture of ethanol and water (3.8:1 by volume) to give brownish-red crystals. To a suspension of 5.4 ml. (0.20 mole) of 90 percent hydrogen peroxide in 100 ml. of methylene chloride was added with cooling and stirring 34.0 ml. (2.24 moles) of trifluoroacetic anhydride. To the cooled solution over a period of ½ hour, was added in a dropwise manner a solution of 7.9 grams (0.0333 mole) of the azo compound in 20 ml. of methylene chloride. The mixture was heated under reflux for 2 hours. After the methylene chloride solution was washed with two 100-ml. portions of water and three 100-ml. portions of 10 percent sodium carbonate solution, it was dried with anhydrous sodium sulfate. Concentration of the extract gave a solid, wt. 6.5 grams (77 percent) M.P. 44 to 50° C. The material was soluble in ethanol, methylene chloride, ethyl ether, benzene and carbon tetrachloride, and insoluble in water and hexane. Recrystallization from hexane gave a white crystalline solid, M.P. 49 to 50° C.

*Analysis.*—Calc'd for $C_9H_{10}N_4O_5$: percent C, 42.52; percent H, 3.96; percent N, 22.04. Found: percent C, 43.20; percent H, 4.02; percent N, 21.41. Molecular weight: 254, 257 and 258 (benzene).

EXAMPLE II

*Preparation of 2-(2,4-dinitrophenylazoxy)-2-nitropropane*

A solution of 11.1 grams of sodium nitrite in 100 ml. of conc. sulfuric acid is added below about 20° C. to 20 grams of 2,4-dinitroaniline dissolved in glacial acetic acid. The solution of the diazotized amine is added to a mixture consisting of 65 grams of 2-nitropropane, 400 grams of sodium hydroxide and 100 ml. of water. The addition of the acidic solution of the diazonium salt to the alkaline 2-nitropropane solution is carried out in a beaker provided with a mechanical stirrer. The temperature of the reaction mixture is maintained between about —5 and —20° C. and the addition is completed in about 30 minutes. After an additional water is added to the mixture, the temperature is kept at around —10° C. for an additional hour. After the temperature reached —5° C. water is added, and the mixture is divided into eight 300-ml. portions. Each of these portions is added to 1000 ml. of water, and the precipitates which formed are combined and washed with water. The residue is washed with 100 percent ethanol. The ethanol extracts are combined and concentrated to one-half of the original volume. The addition of 800 ml. of water to the concentrated ethanol extract precipitated a solid. The precipitate is washed with 400 ml. of water, and the residue is recrystallized from 80 ml. of 100 percent ethanol to give 15.1 grams of a solid. To a suspension of 90 percent hydrogen peroxide in 100 ml. of methylene chloride is added with cooling and stirring 0.24 mole of trifluoroacetic anhydride. To the cooled solution over a period of ½ hour is added in a dropwise manner a solution of 0.0333 mole of the azo compound in methylene chloride. The mixture is heated under reflux for about 3 hours. After the methylene chloride solution is washed with water and sodium carbonate solution, the 2-(2,4-dinitrophenylazoxy)-2-nitropropane is dried with anhydrous sodium sulfate.

EXAMPLE III

*Preparation of 2-(4-nitrophenylazoxy)-2-nitropropane*

A solution of 11.1 grams of sodium nitrite in 100 ml. of conc. sulfuric acid is added below 20° C. to 20 grams of p-nitroaniline dissolved in 240 ml. of glacial acetic acid. The acidic solution of the diazotized amine is added to a previously prepared mixture consisting of 65 grams of 2-nitropropane, 400 grams of sodium hydroxide and 100 ml. of water. The 2-nitropropane is shaken for 1 hour with about 6 grams of the sodium hydroxide and then added to the solution of about 350 grams of sodium hydroxide in one liter of water. The addition of the solution of the diazonium salt to the alkaline 2-nitropropane solution is carried out in a beaker provided with a stirrer. The temperature of the reaction mixture is maintained between —5° and —20° C., and the addition is completed in 20 minutes. After additional water is added to the mixture, the temperature is kept at about —15° C. for an additional hour. After the temperature reached —5° C. another 500 ml. of water is added, and the mixture is divided into eight 300 ml. portions. Each of these portions is added to 1000 ml. of water, and the precipitates which formed are combined and washed with ten 100-ml. portions of water. The residue is washed with ethanol. The ethanol extracts are combined and concentrated to one-half of the original volume. The addition of water to the concentrated ethanol extract precipitated a solid. The precipitate is washed with water, and the residue was recrystallized from ethanol to give a crystalline solid. To a suspension of 0.20 mole of 90 percent hydrogen peroxide in 100 ml. of methylene chloride is added with cooling and stirring 0.24 mole of trifluoroacetic anhydride. To the cooled solution over a period of ½ hour, is added in a dropwise manner a solution of 0.0333 mole of the azo compound in methylene chloride. The mixture is heated under reflux for 2 hours. After the methylene chloride solution is washed with water and sodium carbonate solution, it is dried with anhydrous sodium sulfate. Concentration of the extract gives a solid. Recrystallization from hexane gives a good yield of 2-(4-nitrophenylazoxy)-2-nitropropane.

EXAMPLE IV

*Preparation of 3-(2-nitrophenylazoxy)-3-nitropentane*

A solution of about 10 grams of sodium nitrite in 100 ml. of conc. sulfuric acid is added below 20° C. to 20 grams of O-nitroaniline dissolved in 240 ml. of glacial acetic acid. The acidic solution of the diazotized amine is added to a previously prepared mixture consisting of 65 grams of 3-nitropentane, 400 grams of sodium hydroxide and 100 ml. of water. The 3-nitropentane is first shaken for 1 hour with 6 grams of the sodium hydroxide and then added to the solution of about 400 grams of sodium hydroxide in 1000 ml. of water. The addition of the acidic solution of the diazonium salt to the alkaline 3-nitropentane solution is carried out in a 4-liter beaker provided with a mechanical stirrer. The temperature of the reaction mixture is maintained between —5 and —20° C., and the adidtion is completed in 20 minutes. After an additional 300 ml. of water is added to the mixture, the temperature is kept at about —10° C. for an additional hour. After the temperature reached —5° C. another 500 ml. of water is added, and the mixture is divided into eight 300-ml. portions. Each of these portions is added to 1000 ml. of water, and the precipitates which formed are combined and washed with ten 100-ml. portions of water. The residue is washed with 100 percent ethanol. The ethanol extracts are combined and concentrated to one-half of the original volume. The addition of water to the concentrated ethanol extract precipitated the solid. The precipitate is washed with 400 ml. of water, and the residue was recrystalilzed from 80 to 100 percent ethanol to give about 10 grams of a crystalline solid. A sample of this material is recrystallized from a mixture of ethanol and water. To a suspension of 0.20 mole of 90 percent hydrogen peroxide in 100 ml. of methylene chloride is added with cooling and stirring 0.24 mole of trifluoroacetic anhydride. To the cooled solution over a period of ½ hour, is added in a dropwise manner a soution of 0.0333 mole of the azo compound in 20 ml. of methylene chloride. The mixture is heated under reflux for 2 hours. After the methylene chloride solution is washed with two 100-ml. portion of water and three 100-ml. portions of 10 perecnt sodium carbonate solution, the 3-(2-nitrophenylazoxy)-3-nitropetane is dried with anhydrous sodium sulfate.

EXAMPLE V

*Preparation of 1-(2-nitrophenylazoxy)-1-nitroethane*

A solution of about 10 grams of sodium nitrite in 100 ml. of conc. sulfuric acid is added below 20° C. to 20 grams of O-nitroaniline dissolved in 240 ml. of glacial acetic acid. The acidic solution of the diazotized amine is added to a previously prepared mixture consisting of 65 grams of 1-nitroethane, 400 grams of sodium hydroxide and 100 ml. of water. The 1-nitrolethane is first shaken for 1 hour with 6 grams of the sodium hydroxide and then added to the solution of about 400 grams of sodium hydroxide in one liter of water. The addition of the solution of the diazonium salt to the alkaline 1-nitroethane solution is carried out in a breaker provided with a mechanical stirrer. The temperature of the reaction mixture is maintained between —5 and —20° C., and the addition is completed in about 20 minutes. After an additional water is added to the mixture, the temperature is kept between about —20 and —10° C. for an additional hour. After the temperature reached —5° C. another 500 ml. of water is added, and the mixture is divided into eight 300-ml. portions. Each of these portions is added to 1000 ml. of water, and the precipitates which formed are combined and washed with water. The residue is then washed with 100 percent ethanol. The ethanol extracts are combined and concentrated to one-half of the original volume. The addition of 800 ml. of water to the concentrated ethanol extract precipitated a solid. The precipitate is washed with water, and the residue was recrystallized from ethanol to give about 15 grams of a crystalline solid. To a cooled solution of about 0.20 mole of perbenzoic acid in about 100 ml. of methylene chloride is added in a dropwise manner a solution of 0.0333 mole of the azo compound in about 20 ml. of methylene chloride. The mixture is heated under reflux for about 2 hours. After the methylene chloride solution is washed with two 100-ml. portions of water and three 100-ml. portions of 10 percent sodium carbonate solution, it is dried with anhydrous sodium sulfate. Concentration of the extract and recrystallization gives a crystalline solid.

The novel azoxy compounds of this invention are inherently useful as explosives because of the presence in the molecule of a plurality of nitro groups. These compounds are also particularly useful in improving the ignition quality of diesel fuels when used therein in small effective amounts of from about 0.2 to about 4 percent by weight. In general, the improved diesel fuel compositions of our invention are prepared simply by dissolving an effective amount of the novel azoxy compounds in the diesel fuel. The resultant fuel compositions possess substantially improved cetane numbers when compared wtih fuels to which no azoxy compound has been added.

Having fully described our invention, it is intended that it be limited only by the lawful scope of the appended claims.

We claim:
1. The compound 2-(2-nitrophenylazoxy-2-nitropropane.
2. The compound 2-(2,4-dinitrophenylazoxy)-2-nitropane.
3. The compound 2-(4-nitrophenylazoxy)-2-nitropropane.
4. The compound 3-(2-nitrophenylazoxy)-3-nitropentane.
5. The compound 1-(2-nitrophenylazoxy)-1-nitroethane.
6. The method of making 2-(2-nitrophenylazoxy)-2-nitropropane which comprises reacting trifluoroperacetic acid with 2-(2-nitrophenylazo)-2-nitropropane.
7. The method of making 2-(2,4-dinitrophenylazoxy)-2-nitropropane which comprises reacting trifluoroperacetic acid with 2-(2,4-dinitrophenylazo)-2-nitropropane.
8. The method of making 2-(4-nitrophenylazoxy)-2-nitropropane which comprises reacting trifluoroperacetic acid with 2-(4-nitrophenylazo)-2-nitropropane.
9. The method of making 3-(2-nitrophenylazoxy)-3-nitropentane which comprises reacting trifluoroperacetic acid with 3-(2-nitrophenylazo)-3-nitropentane.
10. The method of making 1-(2-nitrophenylazoxy)-1-nitroethane which comprises reacting trifluoroperacetic acid with 1-(2-nitrophenylazo)-1-nitroethane.

References Cited by the Examiner

D'Ans et al.: Ber. Deut. Chem., vol. 48, 1915, page 1145.

CHARLES B. PARKER, *Primary Examiner.*

REUBEN ESTEIN, JOSEPH P. BRUST, *Examiners.*

L. A. SEBASTIAN, DONALD M. PAPUGA,
*Assistant Examiners.*